United States Patent [19]
Cordier

[11] Patent Number: 5,331,133
[45] Date of Patent: Jul. 19, 1994

[54] PROCESS PERMITTING THE MODIFICATION OF THE CHEMICAL COMPOSITION OF THE INNER FACE OF A BARREL, AND MACHINE IMPLEMENTING SUCH A PROCESS

[75] Inventor: Bernard Cordier, Cognac, France

[73] Assignee: Seguin Moreau & Co. Of Zone Industrielle, Merpins, France

[21] Appl. No.: 87,085

[22] Filed: Jul. 7, 1993

Related U.S. Application Data

[63] Continuation of Ser. No. 711,700, Jun. 7, 1991, abandoned.

[30] Foreign Application Priority Data

Jun. 7, 1990 [FR] France ............................ 90 07102

[51] Int. Cl.⁵ ........................... H05B 3/58; F24J 3/00
[52] U.S. Cl. .................. 219/523; 219/535; 432/224; 432/231; 432/55
[58] Field of Search ............ 219/546, 523, 535; 217/3 CB, 72, 88, 97; 426/422, 592, 493, 330.4, 330.3; 99/277.1, 277.2; 432/10, 224, 231, 55, 226, 321, 9, 10, 421, 83, 140, 227; 34/13.4, 13.8, 104

[56] References Cited

U.S. PATENT DOCUMENTS

| | | | |
|---|---|---|---|
| 442,219 | 12/1890 | Dunbar | 432/224 |
| 584,861 | 6/1897 | Dunham | 432/224 |
| 2,140,841 | 12/1938 | Leonard et al. | 34/18 |
| 2,185,206 | 1/1940 | Little | 217/3 CB |
| 2,194,433 | 3/1940 | Schorck | 432/224 |
| 2,195,112 | 3/1940 | Klausner | 432/10 |
| 2,507,685 | 5/1950 | Wilde | 432/224 |

FOREIGN PATENT DOCUMENTS 589214 11/1933 Fed. Rep. of Germany .

Primary Examiner—Philip H. Leung
Assistant Examiner—Michael D. Switzer
Attorney, Agent, or Firm—Armstrong, Westerman, Hattori, McLeland & Naughton

[57] ABSTRACT

The present invention relates to a process permitting the modification of the chemical composition of the inner face of a barrel, consisting in heating and in moistening the inner face of the shell (1) of this barrel, characterized in that it consists in alternately heating and moistening, according to a specified heating power and liquid flow rate, and for a specified time, the heating being distributed over the entire height of the shell.

It also relates to a machine implementing this process and comprising a rotating support (12), heating means (19) and moistening means (20, 21, 22) which are vertically displaceable with respect to the main axis of the barrel.

Application: barrels for wines and alcohols.

9 Claims, 1 Drawing Sheet

PROCESS PERMITTING THE MODIFICATION OF THE CHEMICAL COMPOSITION OF THE INNER FACE OF A BARREL, AND MACHINE IMPLEMENTING SUCH A PROCESS

This application is a continuation of application Ser. No. 07/711,700 filed Jun. 7, 1991, abandoned.

The present invention relates to a process permitting the modification of the chemical composition of the inner face of a barrel, and to a machine permitting the implementation of such a process.

This process, commonly, and hereinafter, called "bousinage", consists of a heating and a moistening of the inner face of the shell of barrels, intended to modify by means of thermal action the chemical composition of the superficial areas of the wood and generate particular aromas, which will be extracted by the wines or the alcohols.

A conventional bousinage process consists in heating the inside of the barrels by introducing therein a furnace, for example a wood furnace, and in moistening the inner face of the barrel by rubbing this inner face with a damp rag.

This process does not permit effective control of the bousinage operation, and the aromas will not be well defined nor reproducible from one barrel to another.

The object of the present invention is perfectly to control the bousinage operation by means of a continuous control of the various heating and moistening parameters.

The present invention thus makes it possible to obtain the aromas desired exactly, in a manner which is perfectly reproducible from one barrel to another and/or from one order to another for the same client.

The subject of the present invention is a process permitting the modification of the chemical composition of the inner face of a barrel, which consists in heating and in moistening the inner face of the shell of this barrel.

According to the invention, the process consists in alternately heating and moistening, according to a specified heating power and liquid flow rate, and for a specified time, the heating being distributed over the entire height of the shell.

According to one feature of the invention, the process consists in rotating the shell about its main axis, so as to provide a uniform bousinage over the entire periphery.

A further subject of the present invention is a machine permitting the modification of the chemical composition of the inner face of a barrel.

According to the invention, the said machine comprises a support on which the shell of the barrel rests vertically, and heating means and moistening means which are vertically displaceable with respect to the main axis of the barrel.

According to another feature of the invention, the heating means consist of electrical resistors situated on the outside of a central body, and the moistening means consist of a liquid-inlet tube passing through this central body, of a valve supplying the tube and of injectors placed at the end of the tube. The injectors are situated beneath the resistors so as not to wet them during the moistening phase.

According to yet another feature of the invention, the central body, the resistors and the liquid-inlet tube are integral with a bracket mounted on a movable slide actuated by mechanical means, and the shell of the barrel rests on a support driven in rotation by a geared motor.

A description is given hereinafter, by way of example and with reference to the accompanying figures, of an bousinage process and machine according to the invention.

Figures 1, 2:
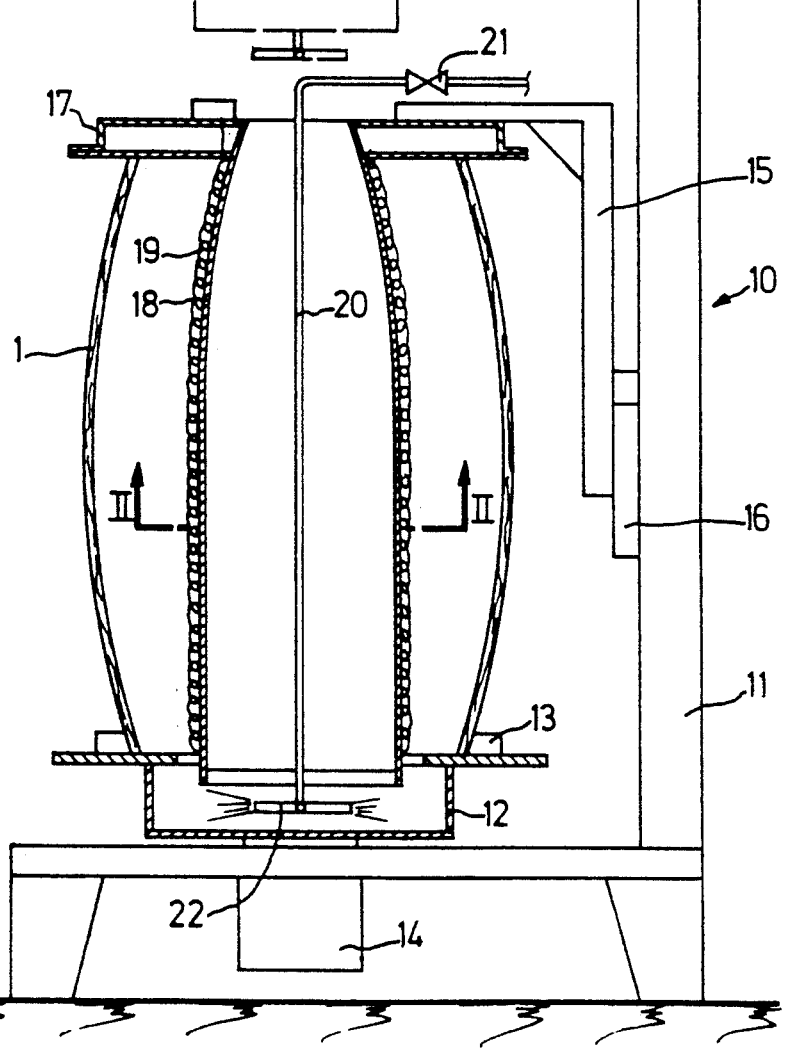
FIG. 1 shows a machine according to the invention.
FIG. 2 shows, in section along II of FIG. 1, details of this machine.

As is shown in FIG. 1, the bousinage machine 10 comprises a stand 11 receiving at its bottom part a rotating platform 12, on which the shell of a barrel 1 rests. The shell is held on the platform by means of keys 13 and this platform is driven in rotation by a geared motor 14.

The machine additionally comprises a bracket 15 fastened on a slide 16 which is vertically displaceable along the stand 11 by means of a rodless jack (not shown), but, of course, this slide may be driven by any suitable mechanical means, such as, for example, a winch, an endless screw, or the like.

The bracket 15 carries a plate 17 on which a hollow central body 18, made of moulded ceramic fibre for example, is fastened. Distributed uniformly about this central body 18 are twelve resistors 19, as can be seen in FIG. 2. A central tube 20 passes through the body 18 over its entire height and this tube is supplied with moistening liquid, such as water, through a valve 21. This tube comprises, at its lower end, four injectors 22, as can be seen in FIG. 2. These injectors are placed beneath the resistors in order not to wet the latter during the moistening phase. So as to ensure, according to clearly defined cycles, a rotation of the platform 12, a vertical displacement of the bracket 15, a triggering and a control of the heating power, and finally a triggering of the water inlet, the geared motor 14, the means for driving the slide 16, and the commands for the resistors and for the valve 21 are controlled via a programmable automatic means.

Such a machine operates in the following manner:

the various parameters are set as a function of the bousinage to be obtained (heating power and time, amount of water and moistening time, number of cycles, etc.);

the shell of the barrel is positioned on the platform (this may also be achieved by an automatic machine);

and the machine automatically performs the following operations:

setting in rotation of the platform;
first cycle:
    lowering of the bracket;
    heating;
    switching off the heating;
    raising of the bracket and simultaneous moistening;
second cycle:
    lowering of the bracket;
    heating;
    switching off the heating;
    raising and moistening;
final cycle:
    lowering of the bracket;
    heating;
    switching off the heating;
    raising without moistening;
stopping of the platform;
exiting from the barrel.

Of course, the moistening phase may be carried out at the time of the lowering of the bracket, and, in this case, there would be an absence of moistening during the first descent since it is preferable to start a cycle with a heating phase. The final phase of the final cycle would be a heating, since it is also preferable to finish a cycle with a heating phase.

I claim:

1. A machine for modifying the chemical composition of an inner face of a shell of a barrel having a main axis, comprising:
   means for supporting the shell of the barrel with said main axis oriented vertically;
   means for heating the inner face of the shell;
   means for moistening the inner face of the shell;
   means for supporting and vertically displacing, simultaneously, said heating and moistening means along said main axis; and
   means for controlling said heating means and said moistening means so that said inner face of the shell is cyclically, alternately, heated and moistened when said heating and moistening means are moved into said shell by means of said supporting and vertically displacing means.

2. A machine according to claim 1, wherein said heating means comprises electrical resistors arranged on the outside of a central body.

3. A machine according to claim 2, wherein said moistening means comprises a liquid-inlet tube passing through the central body and having a lower end and an upper end, injectors connected to said liquid-inlet tube lower end beneath said resistors, and a valve connected to said liquid-inlet tube upper end.

4. A machine according to claim 3, wherein said supporting and vertically displacing means comprises a bracket mounted on a movable slide actuated by mechanical means.

5. A machine according to claim 4, wherein said central body, said resistors and said liquid-inlet tube are integral with said bracket.

6. A machine according to one of claims 1 to 5, further comprising means for rotating said shell supporting means about the main axis of said barrel.

7. A machine according to claim 3, wherein said controlling means comprises a programmable automatic controlling means.

8. A process for modifying the chemical composition of an inner face of a shell of a barrel, said barrel having a main axis, comprising the steps of:
   a) placing the shell of the barrel on a rotatable support, with said main axis being oriented vertically and under vertically displaceable heating and moistening means;
   b) rotating the support and the shell about said main axis;
   c) lowering, simultaneously, said heating and moistening means from a first position situated above said shell to a second position situated within said shell; said moistening means being disposed under said heating means;
   d) heating the inner face of the shell with a specified heating power for a specified time;
   e) stopping said heating;
   f) lifting up said heating and moistening means from said second position to said first position;
   g) moistening the inner face of said shell with a specified liquid flow rate for a specified time while said heating and moistening means are lifted up from said second position to said first position;
   h) repeating steps c to f; and
   i) stopping the rotation of said support.

9. A process according to claim 8, further comprising, before step h), repeating steps c) to g).

* * * * *